(12) United States Patent  (10) Patent No.: US 7,471,826 B1
Navon et al.  (45) Date of Patent: Dec. 30, 2008

(54) CHARACTER SEGMENTATION BY SLICES

(75) Inventors: Yaakov Navon, Ein Vered (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,309

(22) Filed: Mar. 31, 2008

(51) Int. Cl.
G06K 9/00 (2006.01)
G06K 9/34 (2006.01)
H04N 1/387 (2006.01)
H04N 1/46 (2006.01)

(52) U.S. Cl. .................. 382/171; 382/164; 382/176; 382/177; 358/453; 358/538

(58) Field of Classification Search ........ 382/164, 382/168, 170, 171, 173–180, 194–198, 200, 382/229–231; 358/453, 538
See application file for complete search history.

(56) References Cited

U.S. PATENT DOCUMENTS

| 4,377,803 | A | 3/1983 | Lotspiech et al. |
| 4,635,290 | A | 1/1987 | Tsuji et al. |
| 5,046,114 | A | 9/1991 | Zobel |
| 5,369,715 | A | 11/1994 | Tanaka et al. |
| 5,684,891 | A | 11/1997 | Tanaka et al. |
| 5,703,962 | A | 12/1997 | Niki et al. |
| 5,915,039 | A | 6/1999 | Lorie et al. |
| 6,026,177 | A | 2/2000 | Mong et al. |
| 6,035,061 | A | 3/2000 | Katsuyama et al. |
| 6,115,497 | A | 9/2000 | Vaezi et al. |
| 2003/0113016 | A1 | 6/2003 | Naoi et al. |
| 2003/0118211 | A1 | 6/2003 | Eguchi et al. |

*Primary Examiner*—Aaron W Carter
(74) *Attorney, Agent, or Firm*—Connolly Bove Lodge & Hutz LLP; Robert M. Trepp

(57) ABSTRACT

A method for segmentation of characters in text that segments text into lines, words and slices and determines at least one of fixed pitch and proportional pitch prior to segmentation. The method computes histograms of the lines and defines widths of lobes of the histograms of the lines as the character pitches. In addition, the method further analyzes the character pitches; segments lines into words; computes histograms of the words and aggregating the histograms of the words at predetermined points. Moreover, the method segments the words; slicing them words into an upper slice and lower slice and further segments the upper slice and the lower slice. The results are then combined to provide for both coarse and fine segmentation that enhance the performance of character OCR for documents scanned as at least one of gray-scale images and color images.

1 Claim, 4 Drawing Sheets counting people

FIG. 1 counting people

FIG. 2 counting people

FIG. 3 counting people

FIG. 4 c|ount|ing| p|eo|ple|

FIG. 5
(note: the fine segmentation points that appear along the coarse segmentation
vertical lines)

counting people

FIG. 6

CHARACTER SEGMENTATION BY SLICES

FIELD OF THE INVENTION

The present invention generally relates to Optical Character Recognition (OCR) systems and more particularly, to methods for character segmentation with said systems.

BACKGROUND OF THE INVENTION

Automatic OCR is the main tool for extracting textual information from digital images. Hence, performance of document processing systems, to a large extent, depends on the OCR quality. Indeed, even slight improvements in the OCR reading rates translate into significant savings in the cost of document handling.

The OCR process, in turn, can be viewed as a combination of two main sub-processes: (1) segmentation and (2) recognition. The first sub-process locates and "isolates" the characters. The second one classifies the characters in question and assigns to each character a corresponding alpha-numerical symbol. For high quality images, characters are well separated and segmentation process becomes relatively straightforward. However, typical (scanned) images suffer from low contrast and high degree of noise. Moreover, frequently, characters are connected (due to the low quality of printers and typing machines). All these factors complicate the segmentation process and wrong segmentation leads to the failure in the recognition, and, in the worst case, to substitution errors.

Consider for example, a character "n" which is badly segmented and "truncated" on its right side. Such character can be easily misinterpreted as an "r". In such a case the word "counting" may be recognized as "courting". The verification of the word by an English dictionary will not help, since both words are legal. Therefore, there is a need in the art for improved methods for enhancing OCR with segmentation.

SUMMARY OF THE INVENTION

Embodiments of the invention are a new method for segmentation of characters in digital text images. This method can be used as a first stage in the OCR process. In addition, it can be instrumental in layout analysis systems, where text image has to be split into uniform blocks (e.g. abstracts, footnotes, tables etc.).

An embodiment of the invention is a method for segmentation of characters in text, comprising: segmenting text into lines; determining at least one of fixed pitch and proportional pitch by: computing histograms of the lines; defining widths of lobes of the histograms of the lines as character pitches; and analyzing the character pitches; segmenting lines into words; computing histograms of the words; scanning the histograms of the words from left to right; aggregating the histograms of the words at predetermined points; segmenting the words; slicing the words into an upper slice and lower slice; segmenting the upper slice and the lower slice; combining the results for segmenting the upper slice, lower slice and words to obtain coarse segmentation of the words; and performing fine segmentation of the words based on at least one of gray-scale images and color images.

In addition, in embodiments of the above method where analyzing further comprises: identifying fixed pitch segmentation when the character pitches are the same; and identifying proportional pitch segmentation when there are multiple character pitches. Further, the above method where when fixed pitch segmentation is identified, segmenting the words further comprises: skipping from a left side of each of the words by a predetermined pitch size to a reference point; determining a local minima reference point around the reference point within a predefined window; shifting the reference point and the local minima reference point to the right by the predetermined pitch size; creating an updated window to be the union of a first window centered at the reference point and a second window centered at the local minima reference point; finding a second local minima point within the updated window; setting the second local minima point as the local minima reference point; and repeating the steps of shifting, updating, finding and setting until a right side of each of the words is reached and storing the word segmentation results.

Further, in the above embodiment of the invention, where when proportional pitch segmentation is identified, segmenting the upper slice and lower slice further comprises: skipping from a left side of each of the upper slice and lower slice by a predetermined pitch size to a reference point; determining a local minima reference point around the reference point within a predefined window; shifting the reference point and the local minima reference point to the right by the predetermined pitch size; creating an updated window to be the union of a first window centered at the reference point and a second window centered at the local minima reference point; finding a second local minima point within the updated window; setting the second local minima point as the local minima reference point; repeating the steps of shifting, updating, finding and setting until a right side of each of the upper slice and lower slice is reached; combining segmentation results from the word, upper slice and lower slice; and identifying optimal separation points from the combined segmentation results.

Further, in the above embodiment of the invention, where when proportional pitch segmentation is identified, segmenting the words further comprises: skipping from a left side of each of the words by a predetermined pitch size to a reference point; determining a local minima reference point around the reference point within a predefined window; shifting the reference point and the local minima reference point to the right by the predetermined pitch size; creating an updated window to be the union of a first window centered at the reference point and a second window centered at the local minima reference point; finding a second local minima point within the updated window; setting the second local minima point as the local minima reference point; and repeating the steps of shifting, updating, finding and setting until a right side of each of the words is reached; accepting only valid fixed pitch segmentation points for each potential pitch; testing each potential pitch; removing identical segmentation points; and storing the word segmentation results.

Further, in the above embodiment of the invention, where when proportional pitch segmentation is identified, segmenting the upper slice and lower slice further comprises: skipping from a left side of each of the upper slice and lower slice by a predetermined pitch size to a reference point; determining a local minima reference point around the reference point within a predefined windows; shifting the reference point and the local minima reference point to the right by the predetermined pitch size; creating an updated window to be the union of a first window centered at the reference point and a second window centered at the local minima reference point; finding a second local minima point within the updated window; setting the second local minima point as the local minima reference point; and repeating the steps of shifting, updating, finding and setting until a right side of each of the upper slice and lower slice is reached; accepting only valid fixed pitch segmentation points for each potential pitch; testing each potential pitch; removing identical segmentation points;

combining segmentation results from the word, the upper slice and lower slice; and identifying optimal separation points from the combined segmentation results.

Further, in the above embodiment of the invention, where segmenting the upper slice and lower slice, further comprises: at least one of analyzing histograms and analyzing connected components; combining segmentation results from the word, the upper slice and lower slice; and identifying optimal separation points from the combined segmentation results.

Embodiments of the invention further include methods for segmenting words down to their individual characters in order to enhance OCR results. The main idea is to create horizontal slices of words and to segment them separately, while creating potential segmenting points. These segmenting points from the slices are then combined to create the best segmentation points for the words. As a last step, the segmentation is locally refined at the gray or color levels in order to create an even finer segmentation.

Advantages of embodiments of the invention over the background art include, but are not limited to: (1) combination of segmentations derived from the top and bottom image slices and the global segmentation; (2) character pitch estimation and the way pitch is used for segmentation; (3) multiple segmentation paths which increase OCR reliability; (4) finer grain segmentation steps around the possible segmentation points that help to treat properly connected characters; (5) evaluating the segmentation of a word by look up dictionary methods; (6) scanning the text as a gray-scale image for OCR provides further methods of distinguishing boundaries.

BRIEF DESCRIPTION OF THE DRAWINGS

The invention can be described in greater detail with the aid of the following drawings.

FIG. 1 illustrates an exemplary line image.

FIG. 2 illustrates an exemplary upper slice of a line image.

FIG. 3 illustrates an exemplary lower slice of the line image.

FIG. 4 illustrates an exemplary set of possible coarse segmentation points the line image.

FIG. 5 illustrates an exemplary refinement of along the coarse segmenting vertical lines.

FIG. 6 illustrates an exemplary segmented image.

DETAILED DESCRIPTION OF THE PREFERRED EMBODIMENT

Figure 7:
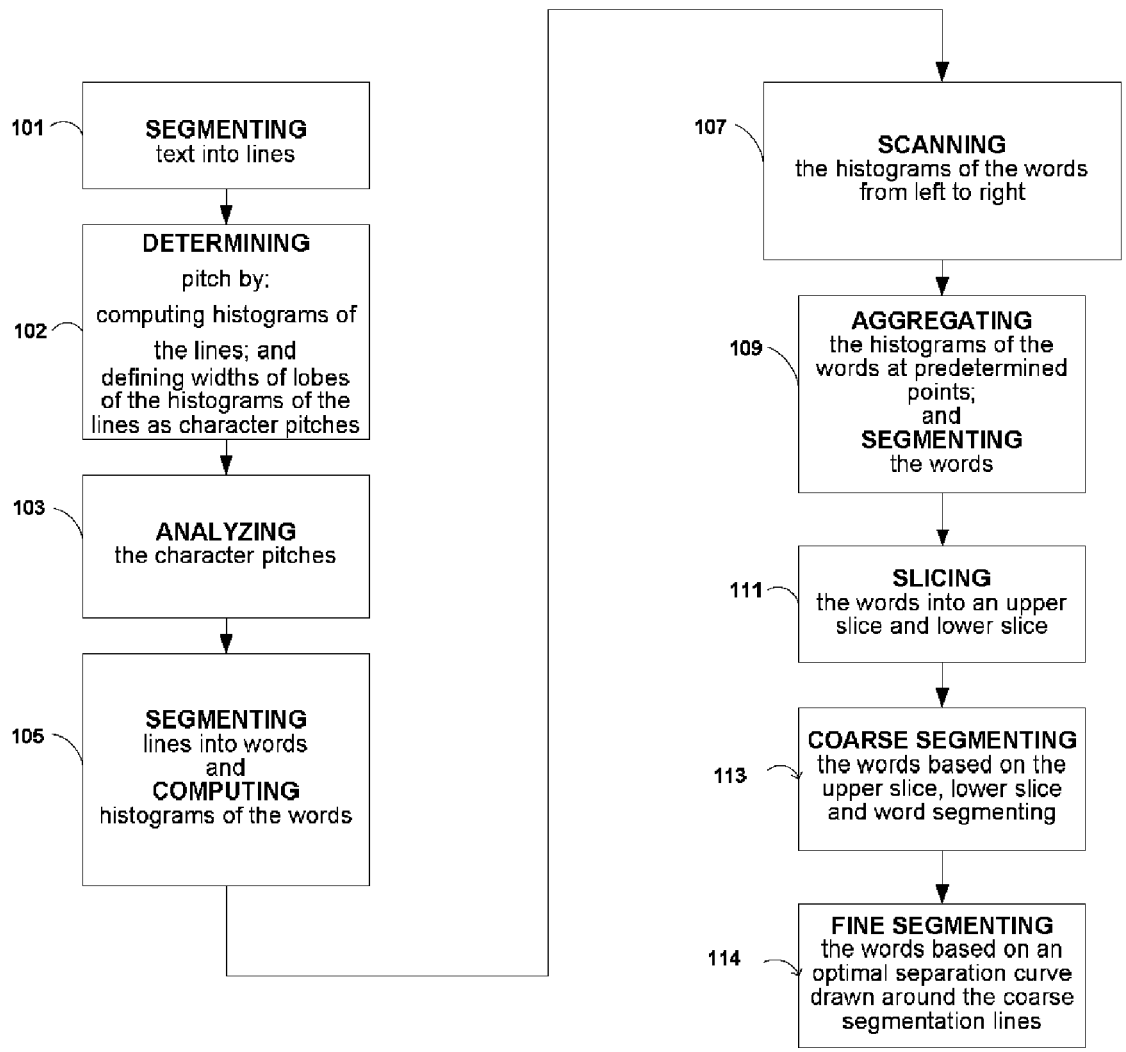
FIG. 7 illustrates an exemplary flow diagram for the general method for segmentation

Paper documents are scanned and converted into digital images. In order to preserve image quality, the images are often acquired either in grey-scale or in color. Optionally the images may go through the pre-processing stage including image enhancement, de-skewing and binarization. Next segmentation is applied.

Some sample digital images are provided as an illustration of embodiments of the method of the invention as applied to the image in FIG. 1. The text is segmented into lines while using layout analysis technologies. The font type (i.e., fixed or proportional) and the relevant pitch/pitches are defined as in the follows:

1. The lines of the histograms are computed by adding up all the picture elements or pixels in each column of each line. The lobes of the histograms are then defined.

2. The widths of the lobes are considered as the character pitches. If the image in question is of the fixed pitch type, then one pitch is expected (i.e., all the widths of the lobes are of almost equal size).

3. On the other hand, if the image in question is of the proportional pitch type, then several dominant lobe widths are expected.

Note that, up to a tolerance, the number of pitches for a given proportional font is limited. In an exemplary embodiment of the claimed invention, involves classifying the alphabet characters into groups of almost equal pitch: (e.g., [ij1l], [abcd], [mw], [ABS]). This step is carried out over all the lines and, for each line, the pitch/pitches are set.

In cases where a line is too small, the pitch/pitches can be estimated from the lines that are close in vicinity to one another. Each line is segmented into words. Since words are usually well separated, this part of the segmentation method is fairly straightforward.

Word histograms are computed by adding up all the pixels in each column of each word. Each word is segmented while aggregating its histogram values at chosen points. The assumption is that the choice of correct pitch yields the lowest values. In the following we describe exemplary methods for segmentation for the case of fixed pitch and for the case of proportional pitch.

Each word block is split horizontally into two slices: (1) an upper slice and (2) a lower slice, as shown in FIG. 2 and FIG. 3, respectively. In the exemplary embodiments of the invention of FIG. 2 and FIG. 3, the split was done in the middle. However, other methods can be applied as well. Each of the upper and lower slice is segmented separately. This segmentation step can be carried out by any one of the well known methods that include, but are not limited to: histogram analysis, connected component analysis, or applying the above-discussed procedure. In every case one finds optimal separation points in each slice.

Note that in FIG. 1 the characters "ng" in the word "counting" are well separated at the upper slice (i.e., see FIG. 2) and connected at the lower slice (i.e., see FIG. 3). The opposite occurs in the characters "ou" of the same word, where separation is better at the lower slice. Thus, both a coarse and fine segmentation must be deduced by combining segmentation results of both the upper and lower slices. This will be discussed further in the paragraphs below.

The optimal separation points of the word block coarse segmentation can be deduced from the optimal separation points received from the upper and lower slices and from the non-split word (i.e., see FIG. 1) by several methods. In the following paragraphs, two exemplary embodiments of the method of the invention are discussed.

In an exemplary embodiment of a first method:

1. Places where "top", "bottom" and "global" segmentations coincide, up to a given tolerance, are accepted as stable segmentation points (or segmentation anchors). If such points do not exist then the start point and the end point of the word block are consider as the segmentation anchors.

2. Next we look for the segmentation points between anchors. We start from the left anchor point and proceed in an iterative manner. At each step we consider segmentation point candidates from either top bottom slices or global. If distance between candidate segmentation point and left anchor point is the same as one of the pitches (within a predefined tolerance) then candidate point is accepted. Such point becomes new anchor point and entire process is repeated until the right anchor point is met.

3. If, at one of the pitches distance, one encounters more than one candidate segmentation point then both alternatives are checked. Correct alternative is the one that yields sequence of valid segmentation points between two anchor points.
4. If, at one of the pitches distance, there are no candidate points then small window is open (at the pitch distance). New anchor point is set at the point, within the window, where histogram value is the lowest.

The above-discussed first method is illustrated by FIG. 4. As shown in FIG. 4, long vertical lines represent anchor points, while short vertical lines stand for candidate coarse segmentation points. Final coarse segmentation decisions are depicted by the vertical lines in FIG. 5.

In an exemplary embodiment of the second method:
1. For the "top", "bottom" and "global" segmentation set, OCR is applied. This process returns, for each segment, optimal classification and recognition probability.
2. Recognition results are analyzed. Places where "top", "bottom" and "global" segmentations coincide are accepted as stable segmentation points (or segmentation anchors).
3. In image sections between anchor points "mean top", "mean bottom" and "mean global" probabilities are computed. In the preferable implementation of this disclosure "mean" is defined as a geometric average of all the probabilities of the characters created by each kind of segmentation. Alternatively, other algorithms can be used.
4. The chosen segmentation set is the one which gives the higher "mean".

Once coarse segmentation is completed, as described above, we proceed to fine segmentation. Indeed, as discussed above, optimal segmentation can't be obtained by merely cutting the image along vertical lines shown in FIG. 5. Accordingly, in the vicinity of each vertical line of the coarse segmentation points (i.e., computed as outlined above), a small predefined window is opened. In this window, an optimal separation curve is defined.

In a preferred embodiment of the invention, the optimal separation curve along the coarse segmentation vertical line, is found by drawing a curved line through maximal intensity pixels within the predefined small window.. However, other algorithms can be used as well. For the sample image of FIG. 5 fine segmentation lines are represented by the additional "broken" lines drawn around the coarse segmentation vertical line. The final segmented image is depicted in FIG. 6.

FIG. 7 is an exemplary embodiment of the invention for a method for segmentation of characters in text, where step 101 is segmenting text into lines. Step 102 involves determining at least one of fixed pitch and proportional pitch by: computing histograms of the lines and defining widths of lobes of the histograms of the lines as character pitches. Analyzing the character pitches occurs in step 103. In step 105, segmenting lines into words and computing histograms of the words. Scanning the histograms of the words from left to right occurs in step 107. Step 109 involves aggregating the histograms of the words at predetermined points and segmenting the words. Slicing the words into an upper slice and lower slice occurs in step 111. Step 113 involves segmenting the upper slice and the lower slice. The combination of steps 100 to step 113 provides for the coarse segmenting of the words. Finally, a fine segmentation of the words based on at least one grayscale images, as shown in FIG. 5, or color images, is performed in step 114.

Figure 8:
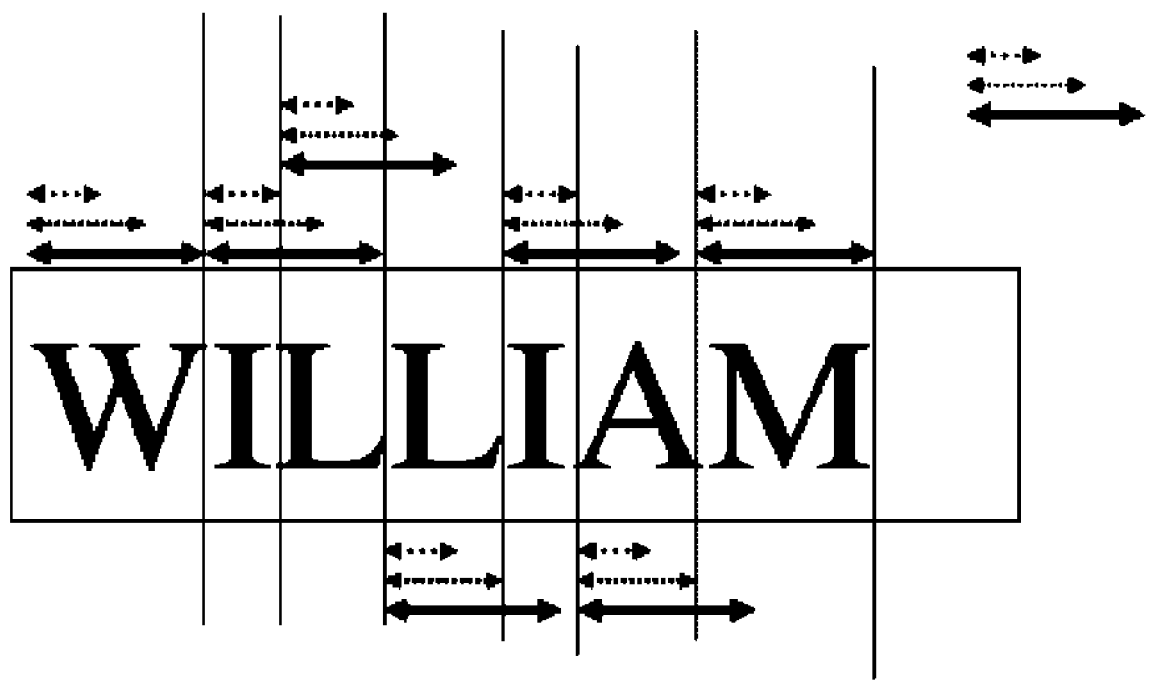
FIG. 8 illustrates an exemplary segmentation of proportional pitch.

An exemplary embodiment of the invention for a method for proportional pitch segmentation is shown in FIG. 8 and comprises the following:
1. Scan the word histogram from the left side of the word to its right side. Start from the left side.
2. Carry out the fixed pitch segmentation procedure for each one of the potential pitches and accept only valid segmentation points. In the example depicted in FIG. 8 three pitches are tested. From the starting point, character "W", the three potentially pitches are tested and only the largest one set a valid segmentation point of "W".
3. From the valid segmentation point/s, test again each one of the potentially pitches. In our example (i.e., see FIG. 8) after "W" we receive two potentially segmentation points; after the "I" and after the first "L".
4. Repeat step 3 until reach the right side of the word.
5. Remove identical segmentation points. In our example the first "L" is twice segmented: once after "W" and the second time after "I".

An exemplary embodiment of the method for fix pitch segmentation, involves the following:
1. Scan the word histogram from the left side of the word to its right side.
2. Skip from the left side of the word by the fix pitch size. Set this point as point A.
3. Find local minima point around A within a predefined window and set this point as point B.
4. Shift to the right points A and B by the pitch size.
5. Update the window to be the union of two windows. The first one is centered at point A and the second one is centered at point B.
6. Find local minima within this window and set it as point B.
7. Repeat steps 4-6 until reach to the right side of the word.

The foregoing description illustrates and describes embodiments of the present invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

In addition, embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection wit a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include, but are not limited to, compact disk read only memory (CDROM), compact disk-read/write (CD-RIW) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to -become coupled to other data processing systems or remote printers or storage devices through intervening private or public networks. Modems, cable modem and Ethernet cards are just a few of the currently available types of network adapters.

The invention claimed is:

1. A method for segmentation of characters in text, comprising:
   segmenting text into lines;
   determining at least one of fixed pitch and proportional pitch by:
      computing histograms of the lines; and
      defining widths of lobes of the histograms of the lines as character pitches; and
      analyzing the character pitches;
   segmenting lines into words;
   computing histograms of the words;
   scanning the histograms of the words from left to right;
   aggregating the histograms of the words at predetermined points;
   segmenting the words; and
   slicing the words into an upper slice and lower slice;
   segmenting the upper slice and the lower slice;
   combining the results for segmenting the upper slice, lower slice and words to obtain coarse segmentation of the words; and
   performing fine segmentation of the words based on at least one of gray-scale images and color images.

* * * * *